US012259808B2

(12) United States Patent
Priyanka et al.

(10) Patent No.: US 12,259,808 B2
(45) Date of Patent: Mar. 25, 2025

(54) METHOD, SYSTEM, AND COMPUTER PROGRAM PRODUCT FOR AUTOMATIC SELECTION OF TESTS FOR SOFTWARE SYSTEM REGRESSION TESTING USING MACHINE LEARNING

(71) Applicant: Visa International Service Association, San Francisco, CA (US)

(72) Inventors: Priyanka, Bangalore (IN); Parthasaradhi Buraga, Bangalore (IN)

(73) Assignee: Visa International Service Association, San Francisco, CA (US)

( * ) Notice: Subject to any disclaimer, the term of this patent is extended or adjusted under 35 U.S.C. 154(b) by 55 days.

(21) Appl. No.: 17/574,618

(22) Filed: Jan. 13, 2022

(65) Prior Publication Data

US 2023/0222051 A1 Jul. 13, 2023

(51) Int. Cl.
*G06F 11/36* (2006.01)
*G06F 11/3604* (2025.01)
*G06F 11/3668* (2025.01)

(52) U.S. Cl.
CPC ...... *G06F 11/3688* (2013.01); *G06F 11/3608* (2013.01)

(58) Field of Classification Search
None
See application file for complete search history.

(56) References Cited

U.S. PATENT DOCUMENTS

| 9,983,981 | B1 * | 5/2018 | Mundada | G06F 11/3676 |
| 10,394,697 | B2 * | 8/2019 | Atyam | G06F 11/3676 |
| 10,678,678 | B1 * | 6/2020 | Tsoukalas | G06F 11/3664 |
| 10,983,904 | B1 * | 4/2021 | Sundararaman | G06F 11/3664 |

(Continued)

FOREIGN PATENT DOCUMENTS

| CN | 102063374 A | 5/2011 |
| CN | 109062782 A | 12/2018 |
| CN | 110633222 A | 12/2019 |

OTHER PUBLICATIONS

Pan, "Test Case Selection and Prioritization Using Machine Learning: a Systematic Literature Review", 2021, arXiv:2106 (Year: 2021).*

(Continued)

*Primary Examiner* — Hossain M Morshed
(74) *Attorney, Agent, or Firm* — The Webb Law Firm (57) ABSTRACT

Provided is a computer-implemented method, system, and computer program product for automatic selection of tests for software system regression testing using machine learning including generating a test mapping including at least one test of a plurality of tests corresponding to a source file. The plurality of tests and the at least one source file are associated with a software repository. Further, determining a defective score for the at least one test based on historical test data of the at least one test, receiving a component criticality score and a defect definition corresponding to the source file, generating a key value corresponding to at least one test based on the defective score, component criticality score, and defect definition, determining a subset of tests of the plurality of tests based on the key value corresponding to the at least one test; and executing the subset of tests with the software repository.

20 Claims, 5 Drawing Sheets

(56) References Cited

U.S. PATENT DOCUMENTS

| | | | |
|---|---|---|---|
| 2013/0166513 A1* | 6/2013 | Rajaram | G06F 16/21 |
| | | | 707/E17.007 |
| 2015/0007140 A1* | 1/2015 | Boshernitsan | G06F 11/3688 |
| | | | 717/124 |
| 2017/0017893 A1* | 1/2017 | Smith | G06N 5/022 |
| 2020/0272559 A1 | 8/2020 | Ahluwalia et al. | |
| 2020/0310948 A1* | 10/2020 | Culibrk | G06N 7/01 |
| 2021/0056009 A1 | 2/2021 | Gal et al. | |
| 2021/0263728 A1* | 8/2021 | Farrier | G06F 17/18 |
| 2021/0303442 A1* | 9/2021 | Chenguttuvan | G06F 11/3684 |

OTHER PUBLICATIONS

Cheruiyot, "Machine Learning Driven Software Test Case Selection", 2021, Concordia University of Edmonton (Year: 2021).*

Bhatnagar, "Regression Test Case Selection Using Machine Learning", Analytics Vidhya, 2020, pp. 1-19, retrieved from https://medium.com/analytics-vidhya/regression-test-case-selection-using-machine-learning-241ded86f559.

Lachmann et al., "System-Level Test Case Prioritization Using Machine Learning", 2016 15th IEEE International Conference on Machine Learning and Applications (ICMLA), IEEE, 2016, pp. 361-368.

* cited by examiner

METHOD, SYSTEM, AND COMPUTER PROGRAM PRODUCT FOR AUTOMATIC SELECTION OF TESTS FOR SOFTWARE SYSTEM REGRESSION TESTING USING MACHINE LEARNING

BACKGROUND

1. Field

This disclosed subject matter relates generally to methods, systems, and products for software system regression testing and, in some particular embodiments or aspects, to a method, system, and computer program product for automatic selection of tests for software system regression testing.

2. Technical Considerations

Software systems generally require thorough validation checks and testing to confirm functional aspects meet project requirements. Testing also assists in minimizing bugs and other unwanted functionality such that software systems can be delivered with high quality. Quality checks and testing for software systems generally need to be done more frequently due to the nature of incremental changes to the system during the development lifecycle. For software systems, quality checks and testing includes regression testing, which executes all software tests to detect bugs and defects that may have been introduced through an incremental change (e.g., code change, code check-in, commit, integration).

Typically, regression testing is performed after each incremental change to a software system. For example, after a software developer integrates a code change for a feature (e.g., new feature, modification, implementation) the entire regression test suite is executed to catch any defects introduced by that particular code change. Executing an entire regression test suite may be time consuming and the benefit of executing the entire suite may be minimal when small changes are integrated into the system. Specific tests may be selected manually after integrating a code change, but this may be time and resource intensive and may cause tests to be missed and not executed.

In order to maintain system quality, the execution of regression tests should be systematic such that the tests are relevant to the code change introduced to the system, but the number of tests executed is not overly time consuming and resource intensive. Code changes to a system may be frequent and may be integrated by multiple developers at the same or different times. Executing tests in the regression test suite which are not relevant to each code change consumes time and resources.

SUMMARY

Accordingly, provided are improved methods, systems, and products for software system regression testing.

According to some non-limiting embodiments or aspects, provided is a computer-implemented method, comprising: generating, with at least one processor, a test mapping comprising at least one test of a plurality of tests corresponding to at least one source file, wherein the plurality of tests and the at least one source file are associated with a software repository; determining, with the at least one processor and at least one machine learning model, a defective score for the at least one test based on historical test data of the at least one test; receiving, with the at least one processor, a component criticality score and a defect definition corresponding to the at least one source file; generating, with the at least one processor and the at least one machine learning model, a key value corresponding to the at least one test based on the defective score, the component criticality score, and the defect definition; determining, with the at least one processor and the at least one machine learning model, a subset of tests of the plurality of tests based on the key value corresponding to the at least one test; and executing, with the at least one processor, the subset of tests with the software repository.

In some non-limiting embodiments or aspects, the computer-implemented method further includes: generating, with the at least one processor, test results based on execution of the subset of tests; and inputting, to the at least one machine learning model, the test results for further training of the at least one machine learning model.

In some non-limiting embodiments or aspects, the computer-implemented method further includes: generating the test mapping comprising detecting at least one source file based on a change to the at least one source file, wherein the change comprises differences between a first version of the at least one source file and a second version of the at least one source file; selecting the at least one test corresponding to the at least one source file based on a predefined mapping of source files to tests; compiling a source file list and a test list, wherein the source file list comprises a source filename of the at least one source file and the test list comprises a test filename of the at least one test; and generating the test mapping from the source file list and the test list by mapping the source filename to its corresponding test filename based on the predefined mapping of source files to tests.

In some non-limiting embodiments or aspects, the computer-implemented method further includes: the at least one source file is a new source file and the change comprises the new source file added to the software repository.

In some non-limiting embodiments or aspects, the computer-implemented method further includes: determining the subset of tests comprises: generating a recommended subset of tests based on the key value and a predefined test category; generating a mapping file based on the recommended subset of tests and the at least one source file; storing the mapping file in a database; and formatting the recommended subset of tests into an executable format.

In some non-limiting embodiments or aspects, the computer-implemented method further includes: the at least one machine learning model uses supervised learning and prediction to determine the subset of tests.

In some non-limiting embodiments or aspects, the computer-implemented method further includes: the mapping file stored in the database is used as input to the at least one machine learning model for further training.

According to some non-limiting embodiments or aspects, provided is a system, comprising: a test selection system; at least one machine learning model; a software repository; and at least one processor, wherein the at least one processor is programmed or configured to: generate a test mapping comprising at least one test of a plurality of tests corresponding to at least one source file, wherein the plurality of tests and the at least one source file are associated with a software repository; determine a defective score for the at least one test based on historical test data of the at least one test; receive a component criticality score and a defect definition corresponding to the at least one source file; generate a key value corresponding to the at least one test based on the defective score, the component criticality score, and the defect definition; determine a subset of tests of the plurality of tests based on the key value corresponding to the at least one test; and execute the subset of tests with the software repository.

In some non-limiting embodiments or aspects, the system further includes: the at least one processor is further programmed or configured to: generate test results based on execution of the subset of tests; and input, to the at least one machine learning model, the test results for further training of the at least one machine learning model.

In some non-limiting embodiments or aspects, the system further includes: generating the test mapping, the at least one processor is programmed or configured to detect at least one source file based on a change to the at least one source file, wherein the change comprises differences between a first version of the at least one source file and a second version of the at least one source file; select at least one test corresponding to the at least one source file based on a predefined mapping of source files to tests; compile a source file list and a test list, wherein the source file list comprises a source filename of the at least one source file and the test list comprises a test filename of the at least one test; and generate the test mapping from the source file list and the test list by mapping the source filename to its corresponding test filename based on the predefined mapping of source files to tests.

In some non-limiting embodiments or aspects, the system further includes: the at least one source file is a new source file and the change comprises the new source file added to the software repository.

In some non-limiting embodiments or aspects, the system further includes: when determining the subset of tests, the at least one processor is programmed or configured to: generate a recommended subset of tests based on the key value and a predefined test category; generate a mapping file based on the recommended subset of tests and the at least one source file; store the mapping file in a database; and format the recommended subset of tests into an executable format.

In some non-limiting embodiments or aspects, the system further includes: the at least one machine learning model uses supervised learning and prediction to determine the subset of tests.

In some non-limiting embodiments or aspects, the system further includes: the mapping file stored in the database is used as input to the at least one machine learning model for further training.

According to some non-limiting embodiments or aspects, provided is a computer program product, the computer program product comprising at least one non-transitory computer readable medium including one or more instructions that, when executed by at least one processor, cause the at least one processor to: generate a test mapping comprising the at least one test of a plurality of tests corresponding to at least one source file, wherein the plurality of tests and the at least one source file are associated with a software repository; determine a defective score for the at least one test based on historical test data of the at least one test; receive a component criticality score and a defect definition corresponding to the at least one source file; generate a key value corresponding to the at least one test based on the defective score, the component criticality score, and the defect definition; determine a subset of tests of the plurality of tests based on the key value corresponding to the at least one test; and execute the subset of tests with the software repository.

In some non-limiting embodiments or aspects, the computer program product further includes: the one or more instructions further cause the at least one processor to: generate test results based on execution of the subset of tests; and input, to at least one machine learning model, the test results for further training of the at least one machine learning model.

In some non-limiting embodiments or aspects, the computer program product further includes: when generating the test mapping, the one or more instructions further cause the at least one processor to: detect at least one source file based on a change to the at least one source file, wherein the change comprises differences between a first version of the at least one source file and a second version of the at least one source file; select the at least one test corresponding to the at least one source file based on a predefined mapping of source files to tests; compile a source file list and a test list, wherein the source file list comprises a source filename of the at least one source file and the test list comprises a test filename of the at least one test; and generate the test mapping from the source file list and the test list by mapping the source filename to its corresponding test filename based on the predefined mapping of source files to tests.

In some non-limiting embodiments or aspects, the computer program product further includes: the at least one source file is a new source file and the change comprises the new source file added to the software repository.

In some non-limiting embodiments or aspects, the computer program product further includes: when determining the subset of tests, the one or more instructions further cause the at least one processor to: generate a recommended subset of tests based on the key value and a predefined test category; generate a mapping file based on the recommended subset of tests and the at least one source file; store the mapping file in a database; and format the recommended subset of tests into an executable format.

In some non-limiting embodiments or aspects, the computer program product further includes: the mapping file stored in the database is used as input to at least one machine learning model for further training.

Further embodiments or aspects are set forth in the following numbered clauses:

Clause 1: A computer-implemented method, comprising: generating, with at least one processor, a test mapping comprising at least one test of a plurality of tests corresponding to at least one source file, wherein the plurality of tests and the at least one source file are associated with a software repository; determining, with the at least one processor and at least one machine learning model, a defective score for the at least one test based on historical test data of the at least one test; receiving, with the at least one processor, a component criticality score and a defect definition corresponding to the at least one source file; generating, with the at least one processor and the at least one machine learning model, a key value corresponding to the at least one test based on the defective score, the component criticality score, and the defect definition; determining, with the at least one processor and the at least one machine learning model, a subset of tests of the plurality of tests based on the key value corresponding to the at least one test; and executing, with the at least one processor, the subset of tests with the software repository.

Clause 2: The computer-implemented method of clause 1, further comprising: generating, with the at least one processor, test results based on execution of the subset of tests; and inputting, to the at least one machine learning model, the test results for further training of the at least one machine learning model.

Clause 3: The computer-implemented method of clauses 1 or 2, wherein generating the test mapping comprises:

detecting at least one source file based on a change to the at least one source file, wherein the change comprises differences between a first version of the at least one source file and a second version of the at least one source file; selecting the at least one test corresponding to the at least one source file based on a predefined mapping of source files to tests; compiling a source file list and a test list, wherein the source file list comprises a source filename of the at least one source file and the test list comprises a test filename of the at least one test; and generating the test mapping from the source file list and the test list by mapping the source filename to its corresponding test filename based on the predefined mapping of source files to tests.

Clause 4: The computer-implemented method of any of clauses 1-3, wherein the at least one source file is a new source file and the change comprises the new source file added to the software repository.

Clause 5: The computer-implemented method of any of clauses 1-4, wherein determining the subset of tests comprises: generating a recommended subset of tests based on the key value and a predefined test category; generating a mapping file based on the recommended subset of tests and the at least one source file; storing the mapping file in a database; and formatting the recommended subset of tests into an executable format.

Clause 6: The computer-implemented method of any of clauses 1-5, wherein the at least one machine learning model uses supervised learning and prediction to determine the subset of tests.

Clause 7: The computer-implemented method of any of clauses 1-6, wherein the mapping file stored in the database is used as input to the at least one machine learning model for further training.

Clause 8: A system, comprising: a test selection system; at least one machine learning model; a software repository; and at least one processor, wherein the at least one processor is programmed or configured to: generate a test mapping comprising at least one test of a plurality of tests corresponding to at least one source file, wherein the plurality of tests and the at least one source file are associated with a software repository; determine a defective score for the at least one test based on historical test data of the at least one test; receive a component criticality score and a defect definition corresponding to the at least one source file; generate a key value corresponding to the at least one test based on the defective score, the component criticality score, and the defect definition; determine a subset of tests of the plurality of tests based on the key value corresponding to the at least one test; and execute the subset of tests with the software repository.

Clause 9: The system of clause 8, wherein the at least one processor is further programmed or configured to: generate test results based on execution of the subset of tests; and input, to the at least one machine learning model, the test results for further training of the at least one machine learning model.

Clause 10: The system of clauses 8 or 9, wherein, when generating the test mapping, the at least one processor is programmed or configured to: detect at least one source file based on a change to the at least one source file, wherein the change comprises differences between a first version of the at least one source file and a second version of the at least one source file; select at least one test corresponding to the at least one source file based on a predefined mapping of source files to tests; compile a source file list and a test list, wherein the source file list comprises a source filename of the at least one source file and the test list comprises a test filename of the at least one test; and generate the test mapping from the source file list and the test list by mapping the source filename to its corresponding test filename based on the predefined mapping of source files to tests.

Clause 11: The system of any of clauses 8-10, wherein the at least one source file is a new source file and the change comprises the new source file added to the software repository.

Clause 12: The system of any of clauses 8-11, wherein, when determining the subset of tests, the at least one processor is programmed or configured to: generate a recommended subset of tests based on the key value and a predefined test category; generate a mapping file based on the recommended subset of tests and the at least one source file; store the mapping file in a database; and format the recommended subset of tests into an executable format.

Clause 13: The system of any of clauses 8-12, wherein the at least one machine learning model uses supervised learning and prediction to determine the subset of tests.

Clause 14: The system of any of clauses 8-13, wherein the mapping file stored in the database is used as input to the at least one machine learning model for further training.

Clause 15: A computer program product, the computer program product comprising at least one non-transitory computer readable medium including one or more instructions that, when executed by at least one processor, cause the at least one processor to: generate a test mapping comprising the at least one test of a plurality of tests corresponding to at least one source file, wherein the plurality of tests and the at least one source file are associated with a software repository; determine a defective score for the at least one test based on historical test data of the at least one test; receive a component criticality score and a defect definition corresponding to the at least one source file; generate a key value corresponding to the at least one test based on the defective score, the component criticality score, and the defect definition; determine a subset of tests of the plurality of tests based on the key value corresponding to the at least one test; and execute the subset of tests with the software repository.

Clause 16: The computer program product of clause 15, wherein the one or more instructions further cause the at least one processor to: generate test results based on execution of the subset of tests; and input, to at least one machine learning model, the test results for further training of the at least one machine learning model.

Clause 17: The computer program product of clauses 15 or 16, wherein, when generating the test mapping, the one or more instructions further cause the at least one processor to: detect at least one source file based on a change to the at least one source file, wherein the change comprises differences between a first version of the at least one source file and a second version of the at least one source file; select the at least one test corresponding to the at least one source file based on a predefined mapping of source files to tests; compile a source file list and a test list, wherein the source file list comprises a source filename of the at least one source file and the test list comprises a test filename of the at least one test; and generate the test mapping from the source file list and the test list by mapping the source filename to its corresponding test filename based on the predefined mapping of source files to tests.

Clause 18: The computer program product of any of clauses 15-17, wherein the at least one source file is a new source file and the change comprises the new source file added to the software repository.

Clause 19: The computer program product of any of clauses 15-18, wherein, when determining the subset of tests, the one or more instructions further cause the at least one processor to: generate a recommended subset of tests based on the key value and a predefined test category; generate a mapping file based on the recommended subset of tests and the at least one source file; store the mapping file in a database; and format the recommended subset of tests into an executable format.

Clause 20: The computer program product of any of clauses 15-19, wherein the mapping file stored in the database is used as input to at least one machine learning model for further training.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments or aspects that are illustrated in the accompanying figures, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the term "server" may refer to one or more computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments or aspects of the disclosed subject matter are directed to systems, methods, and computer program products for automatic test selection, including, but not limited to, automatic test selection for software system regression testing using machine learning. For example, non-limiting embodiments or aspects of the disclosed subject matter provide generating a test mapping comprising tests (e.g., test files, test cases, test objects, test methods, and/or the like) corresponding to source files (e.g., source code, source code files, project files, and/or the like) where the tests and source files are included in a software repository (e.g., code repository, project, code project, software project, and/or the like), determining a defective score for each test based on historical test data including test failures (e.g., previous test failures, recorded test failures, stored test failures, and/or the like) and test executions (e.g., previous test executions, recorded test executions, stored test executions, and/or the like), receiving a component (e.g., software component, system component, and/or the like) criticality score and a defect definition corresponding to the source file, generating a key value corresponding to at least one entry of the test mapping based on the defective score, component criticality score, and defect definition, determining a subset of tests based on the key value corresponding to the at least one entry of the test mapping, and executing (e.g., running, and/or the like) the subset of tests with the software repository. Such embodiments provide techniques and systems that automatically select tests from a system test suite for regression testing using machine learning to enable maximum code coverage while only executing required tests based on a detected code change (e.g., code check-in, commit, file change, pushed change, code integration, and/or the like) in a software repository. Such embodiments may improve continuous integration activities in a software development project and require less computational resources to test a software repository when a code change is integrated. Such embodiments may reduce the amount of time required to execute regression tests within a software repository. Such embodiments may allow for training a machine learning model to continuously improve the test selection based on previous test selections and previous test executions. Such embodiments may select tests corresponding to the detected code change to be integrated and allow for selecting the most relevant tests for each detected code change. Such embodiments may enable improved product quality in a continuous integration pipeline where changes to a software repository are integrated frequently.

For the purpose of illustration, in the following description, while the presently disclosed subject matter is described with respect to methods, systems, and computer program products for automatic test selection (e.g., for software system regression testing), one skilled in the art will recognize that the disclosed subject matter is not limited to the illustrative embodiments or aspects. For example, the methods, systems, and computer program products described herein may be used with a wide variety of settings, such as software systems and/or integrated software-hardware systems in any setting suitable for using such automatic test selection (e.g., any application in which tests are used to test a system).

Figure 1:
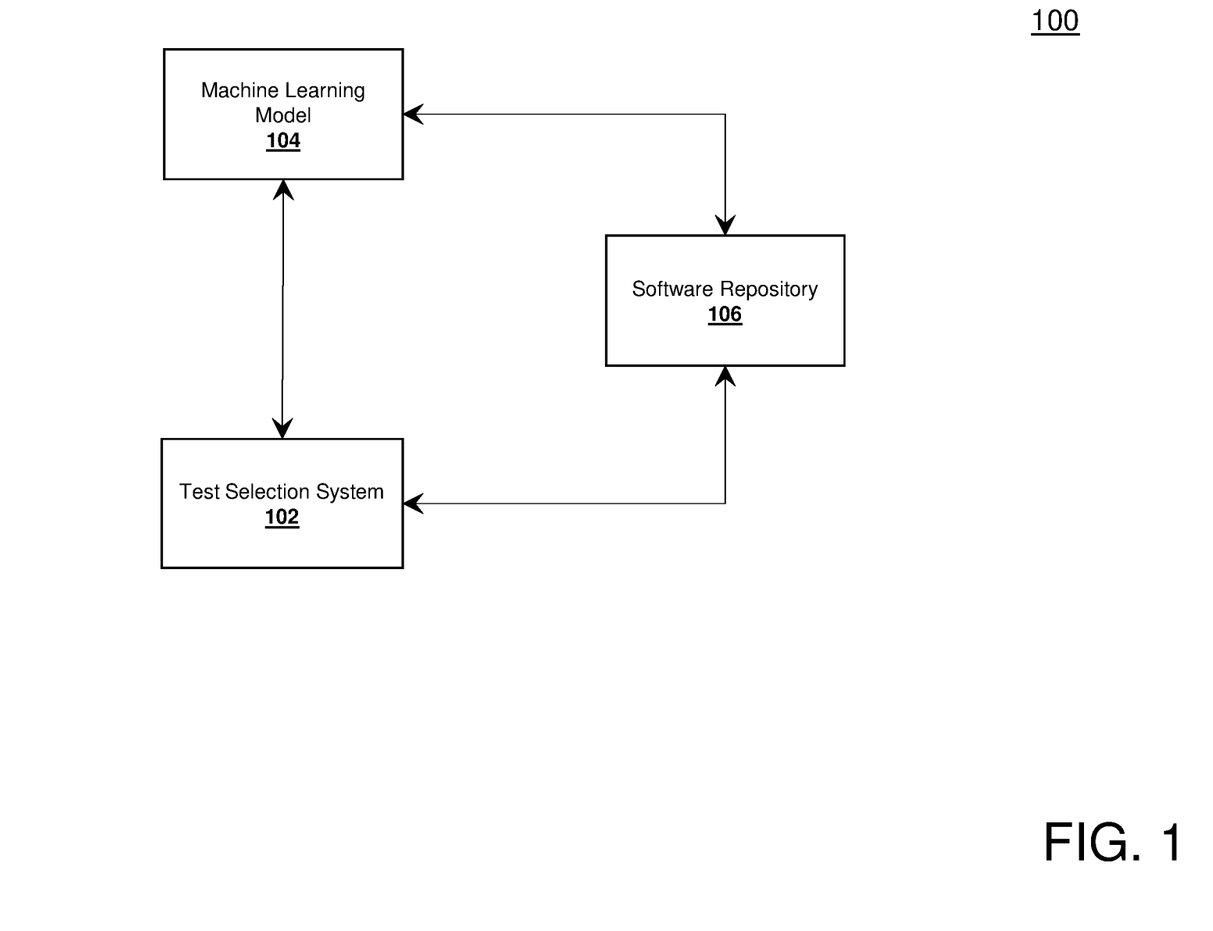
FIG. 1 is a schematic diagram of a system for automatic selection of tests for software system regression testing using machine learning according to some non-limiting embodiments or aspects.

Referring now to FIG. 1, FIG. 1 is a schematic diagram of a system 100 for automatic selection of tests for software system regression testing according to non-limiting embodiments or aspects. System 100 may include test selection system 102, machine learning model 104, and software repository 106. Test selection system 102 may include one or more computing devices executing one or more software applications configured for continuous integration in software development. Continuous integration may include applying code changes, detecting code changes using a version control system, integrating code changes into a software repository 106, building a software repository 106 into an executable software project, executing tests with the executable project, and/or the like. Test selection system 102 may be in communication with machine learning model 104 and software repository 106. In some non-limiting embodiments or aspects, test selection system 102 may include machine learning model 104 and software repository 106 and may execute on the same computing device. In other non-limiting embodiments or aspects, each of test selection system 102, machine learning model 104, and software repository 106 may reside and execute on one or more separate computing devices and may communicate via a communication network. In some non-limiting embodiments or aspects, test selection system 102 may include, or may be in communication with, one or more storage components residing on one or more computing devices.

Machine learning model 104 may include an artificial intelligence model (e.g., artificial neural network, convolutional neural network, deep learning model, and/or the like). Machine learning model 104 may be in communication with test selection system 102 and software repository 106. Machine learning model 104 may be in communication with one or more storage components 408 residing on one or more computing devices.

Software repository 106 may include files corresponding to a software project such as source files, test files, and/or the like. Software repository 106 may reside on one or more computing devices and may be capable of being communicated and copied from one computing device to another computing device via a communication network. Software repository 106 may be in communication with one or more databases residing on one or more computing devices.

Figure 2:
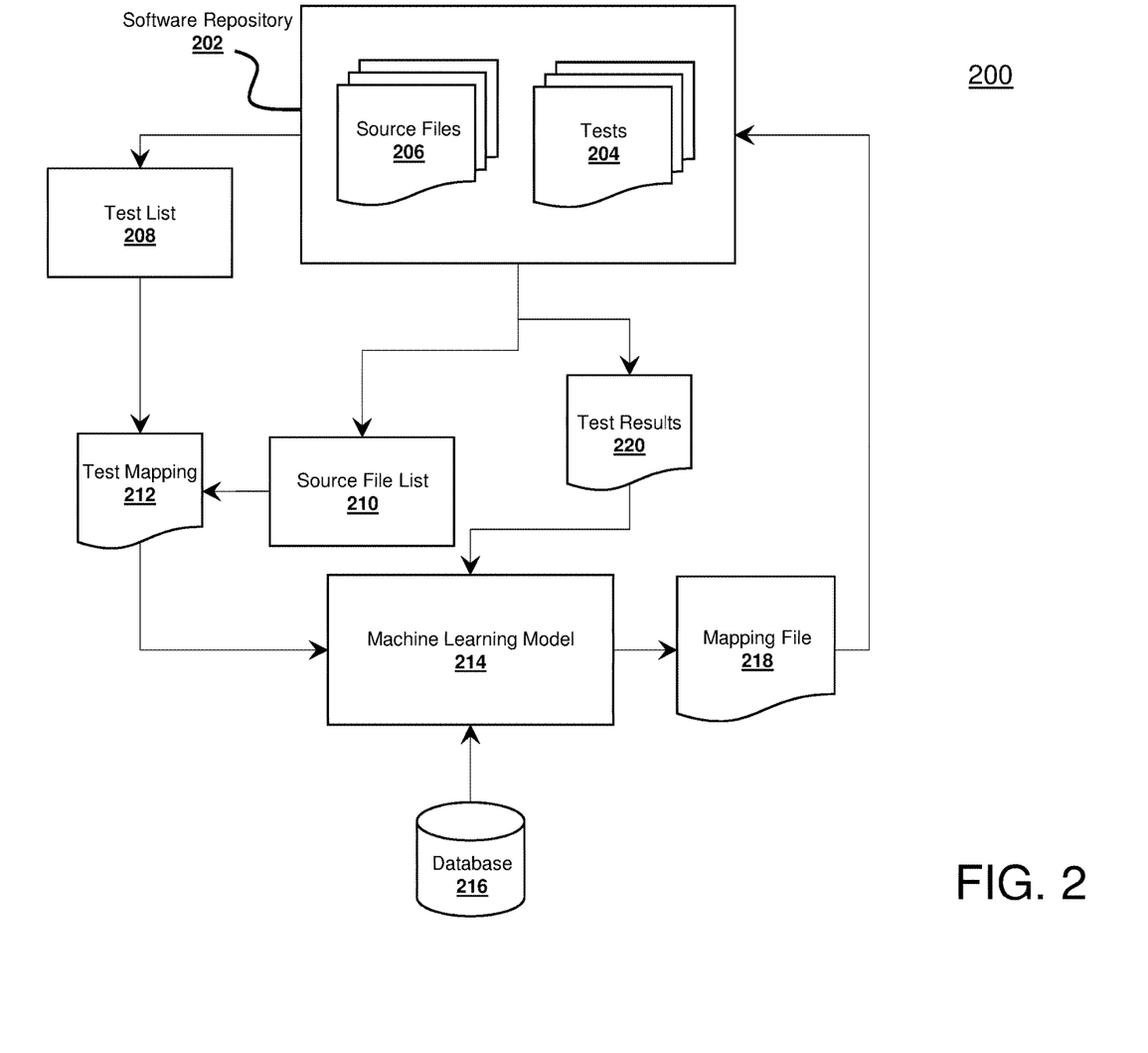
FIG. 2 is a schematic diagram of an exemplary test selection system for automatic selection of tests for software system regression testing using machine learning according to some non-limiting embodiments or aspects.

Referring now to FIG. 2, FIG. 2 is a test selection system for automatic selection of tests for software system regression testing using machine learning. Test selection system 200 may include software repository 202, tests 204, source files 206, test list 208, source file list 210, test mapping 212, machine learning model 214, database 216, mapping file 218, and test results 220.

As shown in FIG. 2, software repository 202 may include tests 204 and source files 206. Software repository 202 may be the same as or similar to software repository 106. In some non-limiting embodiments or aspects, software repository 202 may operate in conjunction with a version control system. For example, software repository 202 may work in conjunction with Git® or Github®. Software repository 202 may operate in conjunction with other version control systems such that code changes within software repository 202 are capable of being detected. In some non-limiting embodiments or aspects, software repository 202 may operate in conjunction with an automation server (e.g., Jenkins®). Software repository 202 may be capable of being copied (e.g., cloned) for purposes of testing and developing. Software repository 202 may exist as multiple copies residing on different computing devices at one time. Software repository 202 may exist as multiple different versions (e.g., including different code changes between versions) and the different versions may reside on different computing devices, such as device 400.

Tests 204 may include software tests (e.g., test files, test cases, test methods, automation scripts, etc.). Tests 204 may include newly developed tests, regression tests, unit tests, component tests, integration tests, and/or the like. In some non-limiting embodiments or aspects, tests 204 may be divided into categories of tests. Tests 204 may be grouped into packages, files, modules, or a similar grouping strategy. Tests 204 may be written in any suitable software language, so long as tests 204 may be formatted into an executable format and executed by processor 404. Code changes to tests 204 may be detected by the version control system when tests 204 are changed or edited. Code changes to tests 204 may include deleting a test, editing a test, renaming a test, or creating a new test.

With continued reference to FIG. 2, source files 206 may include newly developed source files, definition files, implementation files, class files, configuration files, documentation files, user interface files, and/or the like. Source files 206 may be grouped into packages, components, modules, or a similar grouping strategy. In some non-limiting embodiments or aspects, a component may be encompassed by a single source file 206. Source files 206 may be written in any suitable software language, so long as source files 206 may be interpreted by a computing device and formatted into an executable format and executed by processor 404. Code changes to source files 206 may be detected by the version control system when source files 206 are changed or edited. Code changes to source files 206 may include deleting a source file, editing a source file, renaming a source file, or creating a new source file.

Test list 208 may include a listing of test names, test filenames, or other suitable identifiers (e.g., hash) to identify tests. Test list 208 may include identifiers of tests 204 that correspond to a source file 206 based on a predefined mapping of tests 204 to source files 206. Test list 208 may be generated by processor 404.

With continued reference to FIG. 2, source file list 210 may include a listing of source filenames, or other suitable identifiers (e.g., hash) to identify source files. Source file list 210 may include identifiers of source files 206 that correspond to a detected code change detected by the version control system. Source file list 210 may be generated by processor 404.

Test mapping 212 may include a mapping of tests 204 to source files 206. For example, test mapping 212 may include a data structure comprising a mapping (e.g., a recorded correspondence) between tests 204 and source files 206. The mapping of tests 204 to source files 206 may include correspondence relationships such as one-to-one, one-to-many, or many-to-one. The recorded correspondence may be structured in any conceivable manner so long as test mapping 212 may be interpreted by a computing device and/or machine learning model 214. Test mapping 212 may be generated from test list 208 and source file list 210. Test mapping 212 may be input into machine learning model 214 to train machine learning model 214 and to generate mapping file 218. Each test-source file mapping in test mapping 212 may be assigned one or more key values by machine learning model 214. In some non-limiting embodiments or aspects, test mapping 212 may include categories of tests 204 from test list 208 mapped to tests 204 and source files 206. In some non-limiting embodiments or aspects, test mapping 212 may be stored for use in future training of a machine learning model 214.

With continued reference to FIG. 2, machine learning model 214 may include an artificial intelligence model (e.g., artificial neural network, convolutional neural network, deep learning model, and/or the like). In some non-limiting embodiments or aspects, machine learning model 214 may be the same as or similar to machine learning model 104. In some non-limiting embodiments or aspects, test selection system 200 may include one or more machine learning models 214. Machine learning model 214 may generate test mapping 212 from test list 208 and source file list 210. Machine learning model 214 may receive test mapping 212 as input to generate mapping file 218 and/or for training machine learning model 214. In some non-limiting embodiments or aspects, machine learning model 214 may be in communication with database 216.

In some non-limiting embodiments or aspects, machine learning model 214 may receive information from database 216, such as historical test mapping files, historical mapping files, and historical test results. Machine learning model 214 may receive historical defective scores, historical component criticality scores, and historical defect definitions from database 216. Machine learning model 214 may receive, from database 216, defective scores, component criticality scores, and defect definitions corresponding to tests 204 or source file 206 identified in test mapping 212.

Machine learning model 214 may generate mapping file 218. Machine learning model 214 may first generate a recommended subset of tests to be included in mapping file 218. Machine learning model 214 may generate the recommended subset of tests based on a key value corresponding to test mapping 212. Machine learning model 214 may generate, as an output, a key value for each test-to-source file entry in test mapping 212. The key value may be generated based on the defective score, the component criticality score, and the defect definition. In some non-limiting embodiments or aspects, machine learning model 214 may receive test results 220 as input for training machine learning model 214.

With continued reference to FIG. 2, mapping file 218 may contain a subset of tests in relation to tests 204 identified for execution with software repository 202. In some non-limiting embodiments or aspects, mapping file 218 may include a data structure comprising a mapping (e.g., recorded correspondence) between tests 204, source files 206, and/or test categories. The mapping may include one or more entries of recorded correspondence. For example, mapping file 218 may include a data structure of tests 204 with recorded correspondence to source files 206 and/or test categories where a recommended test is included in mapping file 218 with a recorded correspondence to one or more test categories and one or more source files 206. The mapping may include correspondence relationships such as one-to-one, one-to-many, and/or many-to-one. The recorded correspondence may be structured in any conceivable manner so long as mapping file 218 may be interpreted by a computing device and/or machine learning model 214. Tests 204 listed in mapping file 218 may represent the subset of tests to execute with the executable software project. In some non-limiting embodiments or aspects, the subset of tests may or may not be the same as, similar to, and/or include tests 204 identified in test mapping 212. The subset of tests in mapping file 218 may be determined by machine learning model 214, or another machine learning model, based on a recommended subset of tests generated by machine learning model 214. Mapping file 218 may be generated by machine learning model 214. Mapping file 218 may be input into another machine learning model and/or software component for the purpose of reading the subset of tests, fetching the subset of tests identified in mapping file 218, and formatting each test of the subset of tests into an executable format. In some non-limiting embodiments or aspects, mapping file 218 may be stored in database 216 for future use.

Test results 220 may include an indication of a failure or a pass for each executed test of the subset of tests identified in mapping file 218. In some non-limiting embodiments or aspects, test results 220 may include additional information with each pass/fail indication such as execution duration, identification of source files 206 covered, percentage of source files 206 covered, and/or the like. For example, test results 220 may comprise a table where a row may comprise a test 204, the number of times test 204 has failed, an indication of whether test 204 passed or failed on execution, a duration of execution of test 204, a percentage of code covered within a source file 206, and/or the like. Test results 220 may be structured in any conceivable manner so long as test results 220 may be interpreted by a computing device and/or machine learning model 214. Test results 220 may include such information as identification of the code change (e.g., pull request number, commit hash, etc.), components affected, or source files 206 affected. Test results 220 may include a measure of whether to integrate or reject the detected code change. For example, test results 220 may determine if a threshold percentage of passed tests of the subset of tests is satisfied (e.g., met or surpassed) before integrating the detected code change. Test results 220 may be input into machine learning model 214 for training. Additionally or alternatively, test results 220 may be stored in database 216 for later use or training.

Figure 3:
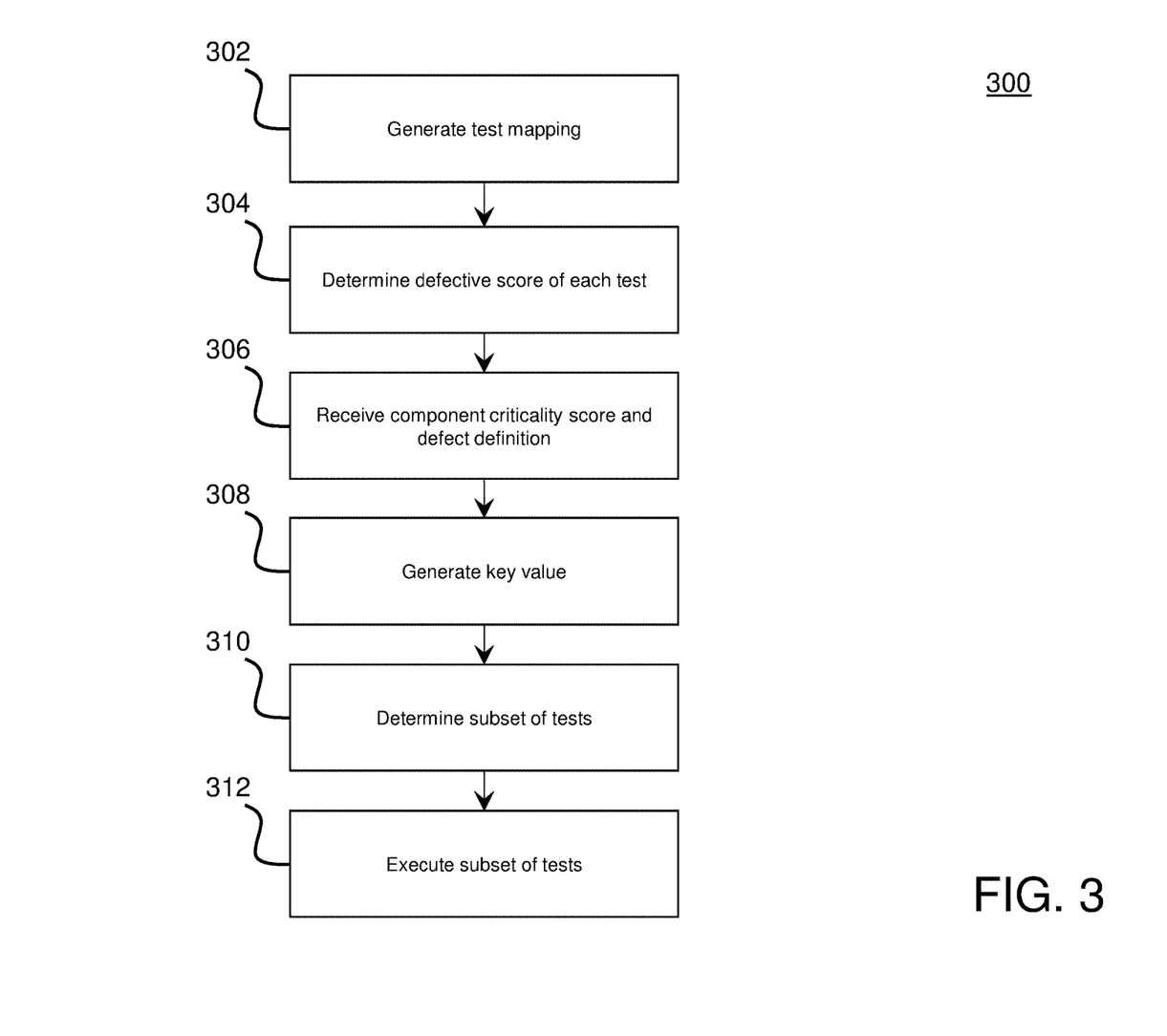
FIG. 3 is a flowchart of a non-limiting embodiment or aspect of a process for automatic selection of tests for software system regression testing using machine learning according to the principles of the presently disclosed subject matter.

Referring now to FIG. 3, FIG. 3 is a process 300 for automatic test selection for system regression testing using machine learning according to some non-limiting embodiments or aspects. The steps shown in FIG. 3 are for example purposes only. It will be appreciated that additional, fewer, different, and/or a different order of steps may be used in non-limiting embodiments or aspects. In some non-limiting embodiments or aspects, one or more of the steps of process 300 may be performed (e.g., completely, partially, and/or the like) by one or more systems 100. In some non-limiting embodiments or aspects, one or more of the steps of a process for automatic test selection may be performed (e.g., completely, partially, and/or the like) by another system, another device, another group of systems, or another group of devices, separate from or including a first computing device.

As shown in FIG. 3 and with reference to FIGS. 1 and 2, at step 302, process 300 may include generating a test mapping 212. For example, a test selection system 100, 200 may generate a test mapping 212 including a plurality of tests 204 corresponding to a source file 206 associated with a software repository 106, 202. The test mapping 212 may correspond to a detected code change in the source file 206 associated with the software repository 106, 202. In some non-limiting embodiments or aspects, the test selection system 100, 200 may generate a test mapping 212 based on a predefined mapping of source files to tests (e.g., test files, test cases, and/or the like). In some non-limiting embodiments or aspects, the predefined mapping may be one-to-one, one-to-many, or many-to-one. The predefined mapping of source files to tests may be based on component groupings, use case flows, data flow testing of source files, control flow testing of source files, and/or the like. Each source file 206 in the test mapping 212 may be associated with a respective code change to the source file and/or to related source files. Related source files may include source files 206 belonging to a common component.

In some non-limiting embodiments or aspects, the test mapping 212 may be automatically generated in response to detecting a code change in a source file 206. The test selection system 100, 200 may generate the test mapping 212 by selecting tests 204 corresponding to the source file 206 containing the code change based on the predefined mapping of source files to tests. In some non-limiting embodiments or aspects, detecting the code change may occur when the code change is integrated with the software repository 106, 202 (e.g., checked-in, committed, pushed, and/or the like). Additionally or alternatively, the code change may be detected after the change is made to the source file but before the source file is integrated with the software repository 106, 202. Regardless of the stage of development in which a code change is detected, a test mapping 212 may be generated comprising a mapping of test-to-source files when a version control system detects the code change.

With continued reference to FIG. 3, as shown at step 304, process 300 may include determining a defective score for each test 204 (e.g., of the plurality of tests 204 within a software repository 106, 202) based on historical test data. For example, the test selection system 100, 200 may determine a defective score of a test 204 corresponding to a source file 206 by indicating the total number of failures of the test 204 when executed with the corresponding source file 206 and/or executable software project during the lifetime of the software repository 106, 202. Additionally or alternatively, the test selection system 100, 200 may determine a defective score of a test 204 by indicating the total number of failures of the test 204 during the lifetime of the software repository 106, 202, irrespective of corresponding source files 206. In some non-limiting embodiments or aspects, a defective score may be determined by assigning a defective score based on a scoring algorithm comprising a predetermined scoring scale. For example, a test may be assigned a defective score from 1-3. If the historical test data of the test 204 comprises less than a threshold number of failures for the test 204, the test 204 may be assigned a defective score of 1. If the historical test data of the test 204 comprises greater than a threshold number of failures, the test 204 may be assigned a defective score of 3. If the historical test data of the test 204 comprises a number of failures within a specified range, the test 204 may be assigned a defective score of 2. It should be appreciated that the scoring algorithms provided herein are exemplary non-limiting embodiments provided for illustration and that the scoring algorithms may be any feasible scoring algorithm to determine the defective score of a test 204. A scoring algorithm may include any such scale, calculation, formula, representation, and/or the like of the measure of the defectiveness of a test 204.

In some non-limiting embodiments or aspects, historical test data may include recorded test failures and recorded test executions of each test 204. Historical test data comprising recorded test failures may include the total number of test failures of a test 204 captured over time during the lifetime of the test 204. Historical test data comprising recorded test executions may include the total number of test executions of a test 204 captured over time during the lifetime of the test 204. Historical test data may be stored in a database 216 or storage component such that the historical test data are accessible by the test selection system 100, 200.

With continued reference to FIG. 3, as shown at step 306, process 300 may include receiving a component criticality score and a defect definition corresponding to the source file 206. For example, the test selection system 100, 200 may receive a respective component criticality score based on the source file 206 or plurality of source files 206 corresponding to a detected code change. The component criticality score may be a score assigned to the component (e.g., software component, software module, software package, and/or the like) of which the source file 206 belongs to. Additionally or alternatively, the component criticality score may be a score assigned to the source file 206 or plurality of source files 206 identified in the corresponding detected code change. In some non-limiting embodiments or aspects, the component criticality score may be received from a user of the test selection system 100, 200 via input through an input component. Additionally or alternatively, the component criticality score may be received from a database 216 or other storage component storing component criticality scores.

The component criticality score may be based on a scoring algorithm. The component criticality score may be based on the importance of the source file 206 or component by considering any relevant factors such as business use case, system availability, cost to develop the component, the requirements of the component, and/or the like. For example, a component or source file 206 may be assigned a component criticality score of 5 (where 5 may indicate a high importance of the component) by a user where that component or source file is part of the user login component of an application. By contrast, a component or source file may be assigned a component criticality score of 1 (where 1 may indicate a low importance) by a user where that component or source file is part of the settings component used to change the color of a user interface of an application. It should be appreciated that the scoring algorithms provided herein are exemplary non-limiting embodiments provided for illustration and that the scoring algorithms may be any feasible scoring algorithm to determine the component criticality score of a component. A scoring algorithm may include any such scale, calculation, formula, or representation of the measure of the component criticality.

In some non-limiting embodiments or aspects, the defect definition corresponding to the source file 206 associated with a detected code change may be a predefined score, rating, or definition based on issues found within the source file. Issues may include bugs, failed tests, customer complaints, error reports, and/or the like. Issues may be stored in an issue tracking database (e.g., Jira®, Azure® DevOps Server, etc.). Additionally, issues may be collected and stored over time for a source file 206. In some non-limiting embodiments or aspects, the test selection system 100, 200 may receive the defect definition through communication with the issue tracking database. In some non-limiting embodiments or aspects, the issue may be related to the component of which the source file 206 belongs to. For example, when detecting a code change in a source file 206 belonging to the user login component of an application, the test selection system 100, 200 may receive a defect definition from an issue tracking database related to the user login component, but the issue may not be related to the corresponding source file 206 directly. In other non-limiting embodiments or aspects, the issue may be directly related to the corresponding source file 206 associated with the detected code change.

In some non-limiting embodiments or aspects, the defect definition may include a defect rating defined by the particular issue database being used. In some non-limiting embodiments or aspects, the defect definition may be defined by a scoring algorithm. For example, if issues are tracked in Jira® or other similar issue tracking platforms for a software repository, the defect definition may include a P0 (outage), P1 (critical), P2 (default), P3 (nice-to-have), or P4 (e.g., spelling errors in documentation) rating. It should be appreciated that the scoring algorithms and defect definitions described herein can apply to a source file 206 or a component of a software system. The following example will reference a component. As an example, if a component includes a P0 or P1 defect, the component may be assigned a defect definition flag of 1 or "True." If a component does not include a P0 or P1 defect, the component may be assigned a defect definition flag of 0 or "False." It should be appreciated that the scoring algorithms provided herein are exemplary non-limiting embodiments provided for illustration and the scoring algorithms may be any feasible scoring algorithm to determine the defect definition of a component. A scoring algorithm may include any such scale, calculation, formula, or representation of the measure of the defect level of a component. For example, a component with a P0 defect may be assigned a defect definition of 5 (where 5 may indicate a critical defect). In contrast, a component with a P4 defect may be assigned a defect definition of 1 (where 1 may indicate a minor defect). In other issue tracking systems, defects may be assigned a severity rating, a risk rating, a priority rating, and/or the like. Such ratings may be used to define a defect definition for a component. In some non-limiting embodiments, the defect definition for a component may be captured for a defined period of time. For example, a component may be assigned a defect definition for an issue which occurred within the past year or a number of months. The issue may be defined as resolved or unresolved in the issue tracking database at the time the defect definition is being received by the test selection system 100, 200. Additionally or alternatively, the issue defining the defect definition may be related or unrelated to the detected code change being detected by the test selection system 100, 200.

With continued reference to FIG. 3, as shown at step 308, process 300 may include generating a key value for each entry in test mapping 212 based on the defective score of the test 204, the component criticality score of the component or source file 206 corresponding to the detected code change, and the defect definition corresponding to the detected code change. For example, the test selection system 100, 200 may generate a key value for an entry of test mapping 212 corresponding to a detected code change by summing the defective score, the component criticality score, and the defect definition. In this instance, a higher key value may indicate the quality of the component or source file 206 corresponding to the detected code change is low while its importance may be higher. Therefore, the detected code change may require executing more tests 204. In contrast, a lower key value may indicate the quality of the component or source file 206 corresponding to the detected code change is high while its importance may be lower. Therefore, the detected code change may require executing fewer tests 204. It should be appreciated that the scoring algorithms provided herein are exemplary non-limiting embodiments provided for illustration and that the scoring algorithms may be any feasible scoring algorithms to determine the key value of a component. A scoring algorithm may include any such scale, calculation, formula, or representation of the measure of the key value of an entry of test mapping 212. For example, the defective score, component criticality score, and defect definition of a detected code change may be averaged to determine the key value. In some non-limiting embodiments or aspects, a higher key value may indicate high quality and low importance, while a lower key value may indicate low quality and high importance.

In some non-limiting embodiments or aspects, the key value may be generated using a machine learning model 214 which receives and processes as input the defective score, the component criticality score, and the defect definition corresponding to a test-to-source file entry in test mapping 212. In some non-limiting embodiments or aspects, machine learning model 214 may use stored historical test data, such as previously generated test mappings 212, from previously detected code changes as input to enhance its learning and affect the key value output. Additionally or alternatively, the machine learning model 214 may use historical test data, such as test results 220 from previously executed tests 204, as input to enhance its learning capabilities and affect the key value output.

With continued reference to FIG. 3, as shown in step 310, process 300 may include determining a subset of tests 204 based on the key value corresponding to the entries in test mapping 212. In some non-limiting embodiments or aspects, a machine learning model 214 may be used to determine the subset of tests 204 based on the key value corresponding to the entries in test mapping 212. The machine learning model 214 may generate a recommended subset of tests 204 based on the key value and predefined test categories. For example, tests 204 may be categorized into categories S1, S2, and S3. For a test mapping 212 corresponding to a detected code change, multiple key value scores may be generated. For example, one entry in test mapping 212 containing a test-to-source file mapping may be assigned one key value. A test-to-source file mapping may have a low key value score, which may indicate higher quality or lower importance. The recommended tests 204 may then be selected from a single category, S1. In contrast, if a key value score indicates low quality or higher importance, recommended tests 204 may be selected from categories S1, S2, and S3 to maximize code coverage. Recommended tests 204 may be recorded in mapping file 218 by machine learning model 214, along with corresponding test categories and/or source files 206. The number of tests, identities of tests 204, or category of tests included in the mapping file 218 should not be understood as limited by the tests 204 included in test mapping 212. In other words, machine learning model 214 may recommended more, fewer, or the same tests 204 that were recorded in test mapping 212 based on model performance of machine learning model 214.

With continued reference to FIG. 3, as shown in step 312, process 300 may include executing the subset of tests with an executable software project. In some non-limiting embodiments or aspects, software repository 202 may be compiled and built into the executable software project. The subset of tests 204 may be formatted and provided to a computing device in an executable format to be executed with the executable software project. The executable software project and the executable subset of tests 204 may be executed concurrently to test the detected code change. In some non-limiting embodiments or aspects, once the subset of tests 204 has completed execution with the executable software project, a test report including test results 220 may be generated based on the execution of the subset of tests 204.

Figure 4:
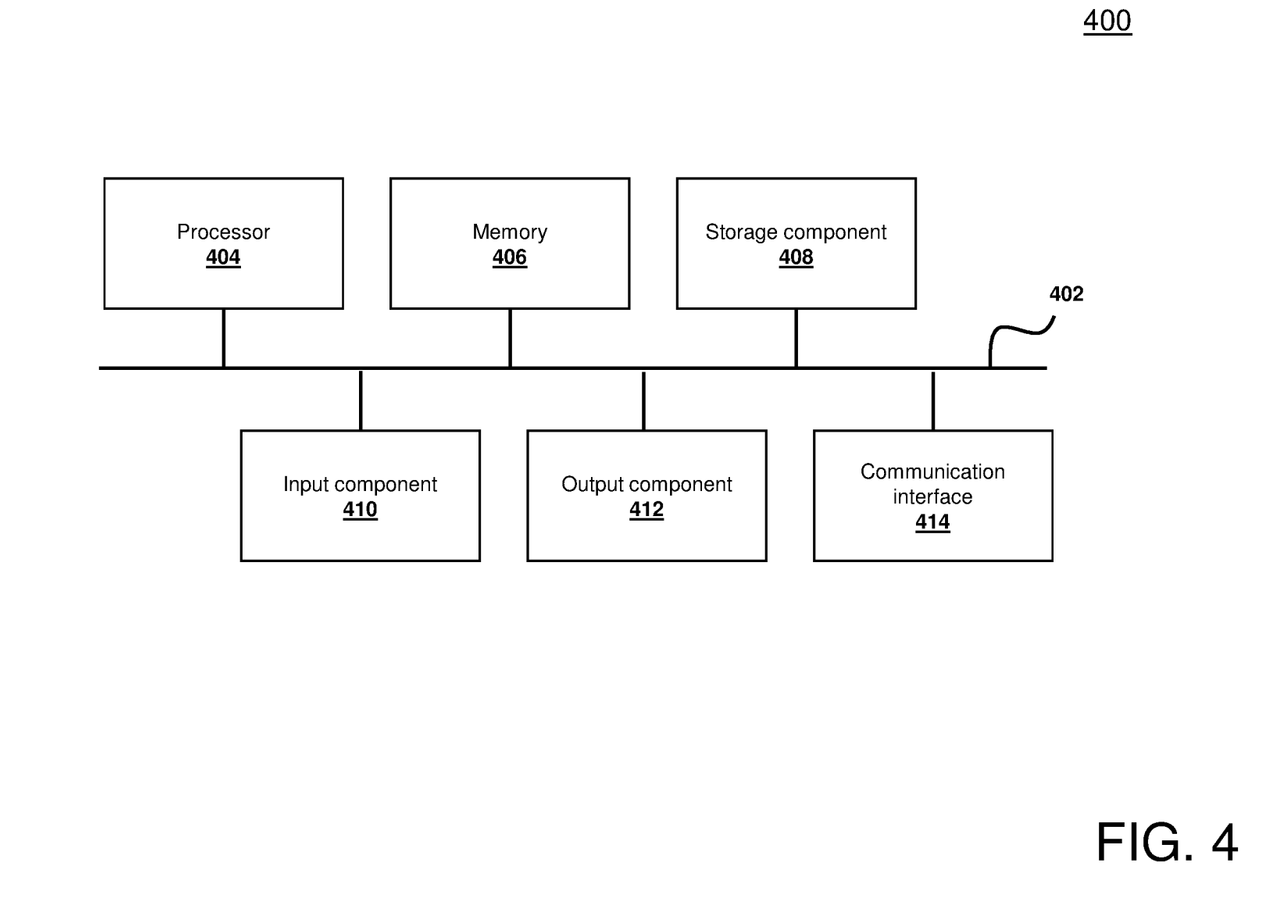
FIG. 4 is a diagram of a non-limiting embodiment or aspect of components of one or more devices of FIG. 1.

Referring now to FIG. 4, FIG. 4 is a diagram of example components of a device 400. Device 400 may correspond to one or more devices of test selection system 102, one or more devices of machine learning model 104, and/or one or more devices of software repository 106. In some non-limiting embodiments or aspects, test selection system 102, machine learning model 104, 214, and/or software repository 106, 202 may include at least one device 400 and/or at least one component of device 400. As shown in FIG. 4, device 400 may include bus 402, processor 404, memory 406, storage component 408, input component 410, output component 412, and communication interface 414.

Bus 402 may include a component that permits communication among the components of device 400. In some non-limiting embodiments or aspects, processor 404 may be implemented in hardware, software, firmware, and/or any combination thereof. For example, processor 404 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 406 may include random access memory (RAM), read-only memory (ROM), and/or another type of dynamic or static storage device (e.g., flash memory, magnetic memory, optical memory, and/or the like) that stores information and/or instructions for use by processor 404.

Storage component 408 may store information and/or software related to the operation and use of device 400. For example, storage component 408 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 410 may include a component that permits device 400 to receive information, such as via user input (e.g., a touch screen display, a keyboard, a keypad, a mouse, a button, a switch, a microphone, a camera, and/or the like). Additionally or alternatively, input component 410 may include a sensor for sensing information (e.g., a global positioning system (GPS) component, an accelerometer, a gyroscope, an actuator, and/or the like). Output component 412 may include a component that provides output information from device 400 (e.g., a display, a speaker, one or more light-emitting diodes (LEDs), and/or the like).

Communication interface 414 may include a transceiver-like component (e.g., a transceiver, a receiver and transmitter that are separate, and/or the like) that enables device 400 to communicate with other devices, such as via a wired connection, a wireless connection, or a combination of wired and wireless connections. Communication interface 414 may permit device 400 to receive information from another device and/or provide information to another device. For example, communication interface 414 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 400 may perform one or more processes described herein. Device 400 may perform these processes based on processor 404 executing software instructions stored by a computer-readable medium, such as memory 406 and/or storage component 408. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 406 and/or storage component 408 from another computer-readable medium or from another device via communication interface 414. When executed, software instructions stored in memory 406 and/or storage component 408 may cause processor 404 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

The number and arrangement of components shown in FIG. 4 are provided as an example. In some non-limiting embodiments or aspects, device 400 may include additional components, fewer components, different components, or differently arranged components than those shown in FIG. 4. Additionally or alternatively, a set of components (e.g., one or more components) of device 400 may perform one or more functions described as being performed by another set of components of device 400.

Figure 5:
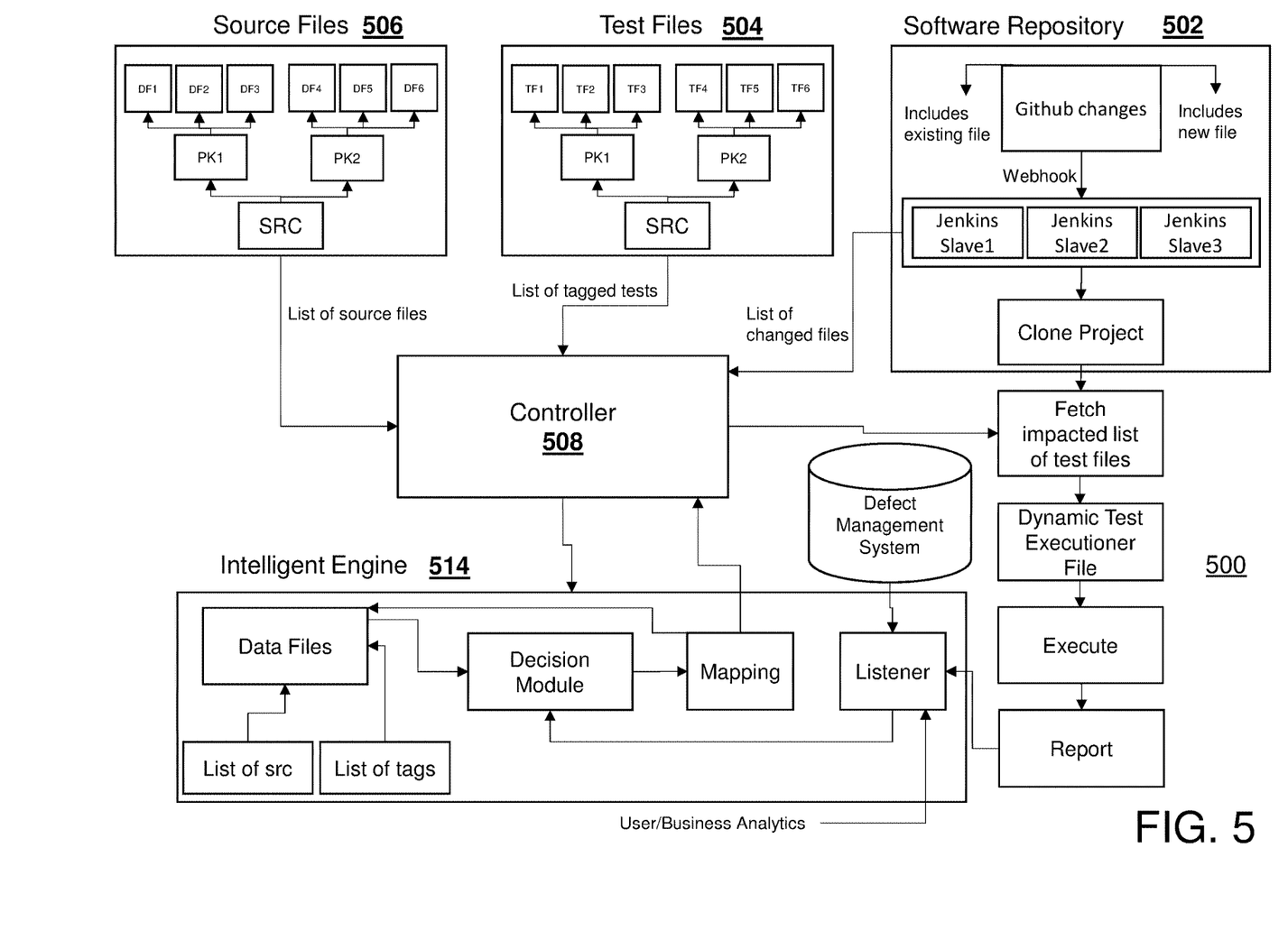
FIG. 5 is a schematic diagram of components of a test selection system for automatic selection of tests for software system regression testing using machine learning according to some non-limiting embodiments or aspects.

Referring now to FIG. 5, FIG. 5 is a schematic diagram of components of a test selection system 500 for automatic selection of tests for software system regression testing using machine learning according to some non-limiting embodiments or aspects. As shown in FIG. 5, test selection system 500 may include test files 504 and source files 506. Test files 504 may be the same as or similar to tests 204, and source files 506 may be the same as or similar to source files 206. In some non-limiting embodiments or aspects, test selection system 500 may include controller 508. Controller 508 may be the same as or similar to test selection system 102. Controller 508 may be capable of controlling execution flow and data sharing between test files 504, source files 506, intelligent engine 514, and software repository 502.

In some non-limiting embodiments or aspects, test selection system 500 may include intelligent engine 514. Intelligent engine 514 may be the same as or similar to machine learning model 104, 214. Intelligent engine 514 may include one or more components comprising one or more machine learning models 104, 214 such as a decision module, a mapping module, and a listener. In some non-limiting embodiments or aspects, intelligent engine 514 may generate a data file, which may be the same as or similar to test mapping 212, from a list of source files 506 and list of test files 504. The decision module may be the same as or similar to machine learning model 214. The decision module may receive the data file as input and may generate a key value based on the defective score, component criticality score, and defect definition corresponding to a particular test 504. In some non-limiting embodiments or aspects, the decision module may generate a recommended subset of tests based on the key value and a predefined test category corresponding to a test 504. The decision module may send the recommended subset of tests to the mapping module to create a mapping file.

In some non-limiting embodiments or aspects, intelligent engine 514 may include a mapping module. The mapping module may receive a recommended subset of tests from the decision module. In some non-limiting embodiments or aspects, the mapping module may generate a mapping file based on the recommended subset of tests and a source file 506. The mapping file may be the same as or similar to mapping file 218. In some non-limiting embodiments or aspects, the mapping file may be sent to controller 508 to fetch the tests 504 of the subset of tests included in the mapping file.

In some non-limiting embodiments or aspects, test selection system 500 may include software repository 502. Software repository 502 may include or operate in conjunction with a version control system. For example, as shown in FIG. 5, software repository 502 may operate in conjunction with Github®. In some non-limiting embodiments or aspects, software repository 502 may include a continuous integration management tool (automation server, continuous integration server, and/or the like). Software repository 502 may communicate with controller 508. For example, software repository 502 may communicate a list of changed source files 506 to controller 508. The list of changed source files 506 may be the same as or similar to source file list 210.

In some non-limiting embodiments or aspects, test selection system 500 may execute the subset of tests included in the mapping file with an executable software project of software repository 502. In some non-limiting embodiments or aspects, software repository 502 may be compiled and built into the executable software project. The subset of tests 504 may be formatted by the mapping module and provided to controller 508 in an executable format to be executed with the executable software project. The executable software project and the executable subset of tests 504 may be executed concurrently to test the detected code change. In some non-limiting embodiments or aspects, once the subset of tests 504 has completed execution with the executable software project, a test report may be generated based on the execution of the subset of tests 504.

In some non-limiting embodiments or aspects, the test report may be communicated to the listener of intelligent engine 514 to be provided as input to the decision module for further processing. In some non-limiting embodiments or aspects, the test report may be stored for future use by the decision module or other machine learning model 214.

Although the disclosed subject matter has been described in detail for the purpose of illustration based on what is currently considered to be the most practical and preferred embodiments or aspects, it is to be understood that such detail is solely for that purpose and that the disclosed subject matter is not limited to the disclosed embodiments or aspects, but, on the contrary, is intended to cover modifications and equivalent arrangements that are within the spirit and scope of the appended claims. For example, it is to be understood that the presently disclosed subject matter contemplates that, to the extent possible, one or more features of any embodiment or aspect can be combined with one or more features of any other embodiment or aspect.

What is claimed is:

1. A computer-implemented method, comprising:
generating, with at least one processor and based on a test list and a source file list, a test mapping comprising a mapping between a plurality of tests and a plurality of source files, wherein the plurality of tests and the plurality of source files are associated with a software repository, each source file in the test mapping associated with a code change, wherein at least one source file in the test mapping is associated with a code change to the at least one source file, and wherein at least one other source file in the test mapping is associated with a code change to a source file that belongs to at least one common component of the at least one other source file;

determining, with the at least one processor and at least one machine learning model, a defective score for each test of the plurality of tests based on historical test data of the test;

receiving, with the at least one processor, a component criticality score and a defect definition for each source file of the plurality of source files, the defect definition comprising at least one of a predefined score or rating based on one or more issues within the source file and stored in an issue tracking database;

generating, with the at least one processor, a key value for each test of the plurality of tests, the key value based on values of the defective score, the component criticality score, and the defect definition;

determining, with the at least one processor and the at least one machine learning model, a subset of tests of the plurality of tests based on key values corresponding to the plurality of tests; and executing, with the at least one processor, the subset of tests with the software repository.

2. The computer-implemented method of claim 1, further comprising:

generating, with the at least one processor, test results based on execution of the subset of tests; and inputting, to the at least one machine learning model, the test results for further training of the at least one machine learning model.

3. The computer-implemented method of claim 1, wherein generating the test mapping comprises:

detecting at least one source file based on a change to at least one source file, wherein the change comprises differences between a first version of the at least one source file and a second version of the at least one source file;

selecting at least one test corresponding to the at least one source file based on a predefined mapping of source files to tests;

compiling the source file list and the test list, wherein the source file list comprises a source filename of the at least one source file and the test list comprises a test filename of the at least one test; and generating the test mapping from the source file list and the test list by mapping the source filename to its corresponding test filename based on the predefined mapping of source files to tests.

4. The computer-implemented method of claim 3, wherein the at least one source file is a new source file and the change comprises the new source file added to the software repository.

5. The computer-implemented method of claim 1, wherein determining the subset of tests comprises:

generating a recommended subset of tests based on the key values and a predefined test category;

generating a mapping file based on the recommended subset of tests and the source files;

storing the mapping file in a database; and formatting the recommended subset of tests into an executable format.

6. The computer-implemented method of claim 1, wherein the at least one machine learning model uses supervised learning and prediction to determine the subset of tests.

7. The computer-implemented method of claim 5, wherein the mapping file stored in the database is used as input to the at least one machine learning model for further training.

8. A system, comprising:

a test selection system;

at least one machine learning model;

a software repository; and at least one processor, wherein the at least one processor is programmed or configured to:

generate, based on a test list and a source file list, a test mapping comprising a mapping between a plurality of tests and a plurality of source files, wherein the plurality of tests and the plurality of source files are associated with the software repository, each source file in the test mapping associated with a code change, wherein at least one source file in the test mapping is associated with a code change to the at least one source file, and wherein at least one other source file in the test mapping is associated with a code change to a source file that belongs to at least one common component with of the at least one other source file;

determine a defective score for each test of the plurality of tests based on historical test data of the test;

receive a component criticality score and a defect definition for each source file of the plurality of source files, the defect definition comprising at least one score, the at least one score based on data in an issue tracking database associated with the source file;

generate a key value for each test of the plurality of tests, the key value based on values of the defective score, the component criticality score, and the defect definition;

determine a subset of tests of the plurality of tests based on key values corresponding to the plurality of tests; and execute the subset of tests with the software repository.

9. The system of claim 8, wherein the at least one processor is further programmed or configured to:

generate test results based on execution of the subset of tests; and input, to the at least one machine learning model, the test results for further training of the at least one machine learning model.

10. The system of claim 8, wherein, when generating the test mapping, the at least one processor is programmed or configured to:

detect at least one source file of the plurality of source files based on a change to the at least one source file, wherein the change comprises differences between a first version of the at least one source file and a second version of the at least one source file;

select, from the plurality of tests, at least one test corresponding to the at least one source file based on a predefined mapping of source files to tests;

compile the source file list and the test list, wherein the source file list comprises a source filename of the at least one source file and the test list comprises a test filename of the at least one test; and generate the test mapping from the source file list and the test list by mapping the source filename to its corresponding test filename based on the predefined mapping of source files to tests.

11. The system of claim 10, wherein the at least one source file is a new source file and the change comprises the new source file added to the software repository.

12. The system of claim 8, wherein, when determining the subset of tests, the at least one processor is programmed or configured to:
generate a recommended subset of tests based on the key values and a predefined test category;
generate a mapping file based on the recommended subset of tests and corresponding source files;
store the mapping file in a database; and
format the recommended subset of tests into an executable format.

13. The system of claim 8, wherein the at least one machine learning model uses supervised learning and prediction to determine the subset of tests.

14. The system of claim 12, wherein the mapping file stored in the database is used as input to the at least one machine learning model for further training.

15. A computer program product, the computer program product comprising at least one non-transitory computer readable medium including one or more instructions that, when executed by at least one processor, cause the at least one processor to:
generate, based on a test list and a source file list, a test mapping comprising a mapping between a plurality of tests and a plurality of source files, wherein the plurality of tests and the plurality of source files are associated with a software repository, each source file in the test mapping associated with a code change, wherein at least one source file in the test mapping is associated with a code change to the at least one source file, and wherein at least one other source file in the test mapping is associated with a code change to a source file that belongs to at least one common component of the at least one other source file;
determine a defective score for each test of the plurality of tests based on historical test data of the test;
receive a component criticality score and a defect definition for each source file of the plurality of source files, the defect definition comprising at least one score;
generate a key value for each test of the plurality of tests, the key value based on values of the defective score, the component criticality score, and the defect definition;
determine a subset of tests of the plurality of tests based on key values corresponding to the plurality of tests; and
execute the subset of tests with the software repository.

16. The computer program product of claim 15, wherein the one or more instructions further cause the at least one processor to:
generate test results based on execution of the subset of tests; and
input, to at least one machine learning model, the test results for further training of the at least one machine learning model.

17. The computer program product of claim 15, wherein, when generating the test mapping, the one or more instructions further cause the at least one processor to:
detect at least one source file based on a change to the at least one source file, wherein the change comprises differences between a first version of the at least one source file and a second version of the at least one source file;
select at least one test corresponding to the at least one source file based on a predefined mapping of source files to tests;
compile the source file list and the test list, wherein the source file list comprises a source filename of the at least one source file and the test list comprises a test filename of the at least one test; and
generate the test mapping from the source file list and the test list by mapping the source filename to its corresponding test filename based on the predefined mapping of source files to tests.

18. The computer program product of claim 17, wherein the at least one source file is a new source file and the change comprises the new source file added to the software repository.

19. The computer program product of claim 15, wherein, when determining the subset of tests, the one or more instructions further cause the at least one processor to:
generate a recommended subset of tests based on the key values and a predefined test category;
generate a mapping file based on the recommended subset of tests and corresponding source files;
store the mapping file in a database; and
format the recommended subset of tests into an executable format.

20. The computer program product of claim 19, wherein the mapping file stored in the database is used as input to at least one machine learning model for further training.

* * * * *